US010948680B1

(12) United States Patent
Yogeeswaran et al.

(10) Patent No.: US 10,948,680 B1
(45) Date of Patent: Mar. 16, 2021

(54) APPARATUSES, SYSTEMS, AND METHODS FOR FIBER OPTIC COMMUNICATION VIA DUCT INSTALLATION

(71) Applicant: Facebook, Inc., Menlo Park, CA (US)

(72) Inventors: Karthik Yogeeswaran, San Francisco, CA (US); Ryan S. King, Danville, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/596,172

(22) Filed: Oct. 8, 2019

Related U.S. Application Data

(60) Provisional application No. 62/743,236, filed on Oct. 9, 2018.

(51) Int. Cl.
*G02B 6/48* (2006.01)
*G02B 6/52* (2006.01)
*F16L 39/00* (2006.01)
*H02G 3/06* (2006.01)
*H02G 9/06* (2006.01)

(52) U.S. Cl.
CPC ............ *G02B 6/486* (2013.01); *F16L 39/00* (2013.01); *G02B 6/48* (2013.01); *G02B 6/52* (2013.01); *H02G 3/06* (2013.01); *H02G 9/06* (2013.01)

(58) Field of Classification Search
None
See application file for complete search history.

(56) References Cited

U.S. PATENT DOCUMENTS

| | | | | | |
|---|---|---|---|---|---|
| 4,715,582 | A | * | 12/1987 | Ikeda | ...................... H02G 1/02 254/134.3 CL |
| 4,966,398 | A | * | 10/1990 | Peterson | ............. F16L 37/0982 285/316 |
| 5,137,306 | A | * | 8/1992 | Flood | ...................... F16L 39/04 285/123.2 |
| 5,217,207 | A | * | 6/1993 | Schmader | ............ G02B 6/4422 254/134.3 CL |
| 5,332,269 | A | * | 7/1994 | Homm | ................... B25B 27/10 285/249 |

(Continued)

FOREIGN PATENT DOCUMENTS

DE 10003695 A1 * 8/2001
JP 8-201667 A * 8/1996

(Continued)

OTHER PUBLICATIONS

"eABF® Fiber Optic Cable and MicroDuct Installation Manual", AFL Dura-Line, May 18, 2015 revision. Retrieved from www.bidnet.com/bneattachments?/427472023.pdf (Year: 2015).*

*Primary Examiner* — Michael Stahl
(74) *Attorney, Agent, or Firm* — FisherBroyles, LLP

(57) ABSTRACT

The disclosed method may include (1) mechanically coupling a first fiber optic cable duct to a powerline conductor, (2) attaching an end of the first fiber optic cable duct to a first port of a duct coupler, (3) attaching an end of a second fiber optic cable duct to a second port of the duct coupler, where the duct coupler forms a contiguous channel with the first fiber optic cable duct and the second fiber optic cable duct, (4) mechanically coupling the second fiber optic cable duct to the powerline conductor, and (5) installing a contiguous fiber optic cable within the contiguous channel. Various other methods, apparatuses, and systems are also disclosed.

8 Claims, 7 Drawing Sheets

(56) References Cited

U.S. PATENT DOCUMENTS

| | | | | | |
|---|---|---|---|---|---|
| 5,470,113 | A | * | 11/1995 | Schwalm | F16L 33/225 |
| | | | | | 285/255 |
| 5,727,106 | A | * | 3/1998 | Sutehall | G02B 6/4422 |
| | | | | | 174/70 A |
| 5,789,701 | A | * | 8/1998 | Wettengel | G02B 6/4422 |
| | | | | | 174/40 R |
| 6,032,448 | A | * | 3/2000 | Baker | G02B 6/4422 |
| | | | | | 57/10 |
| 2004/0253057 | A1 | * | 12/2004 | Tsuchiya | H02G 1/088 |
| | | | | | 405/183.5 |
| 2007/0200344 | A1 | * | 8/2007 | Guest | G02B 6/4459 |
| | | | | | 285/322 |
| 2008/0279506 | A1 | * | 11/2008 | Kerry | G02B 6/4472 |
| | | | | | 385/59 |
| 2014/0265322 | A1 | * | 9/2014 | Thompson | G02B 6/4459 |
| | | | | | 285/345 |
| 2018/0038526 | A1 | * | 2/2018 | Cloninger | F16L 15/08 |
| 2019/0250359 | A1 | * | 8/2019 | Yogeeswaran | G02B 6/486 |

FOREIGN PATENT DOCUMENTS

| | | | |
|---|---|---|---|
| KR | 10-1491010 B1 | * | 2/2015 |
| WO | WO 02/057833 A1 | * | 7/2002 |

* cited by examiner

APPARATUSES, SYSTEMS, AND METHODS FOR FIBER OPTIC COMMUNICATION VIA DUCT INSTALLATION

CROSS REFERENCE TO RELATED APPLICATION

This application claims the benefit of U.S. Provisional Application No. 62/743,236, filed 9 Oct. 2018, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
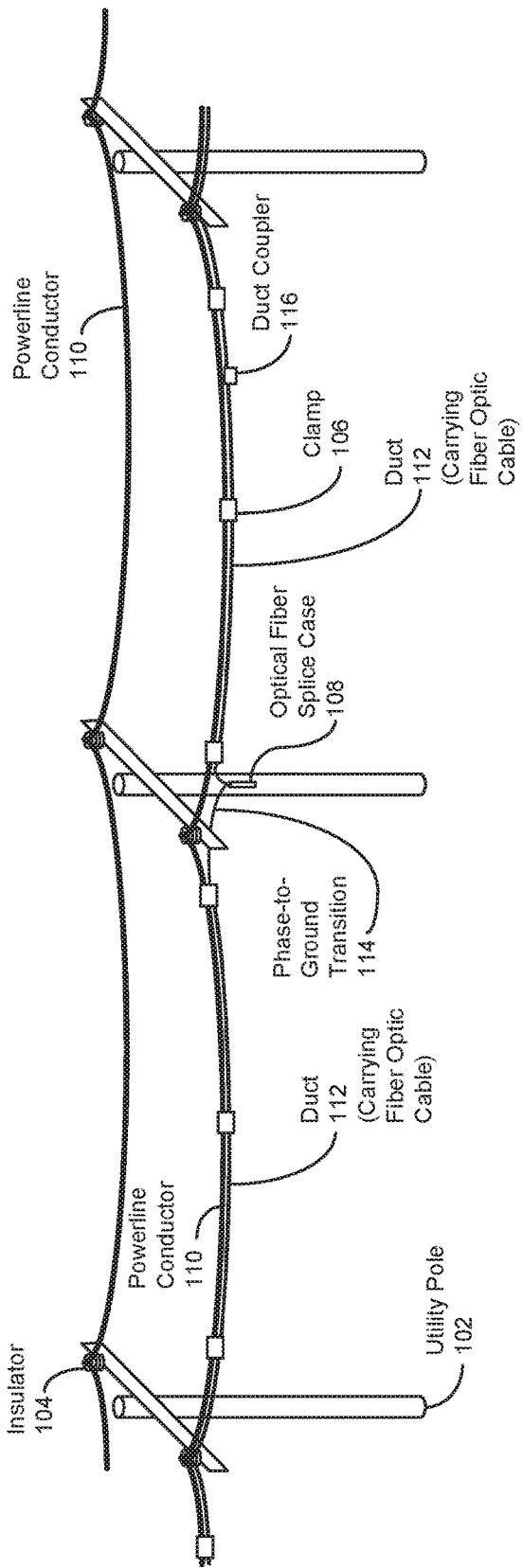
FIG. 1 is a graphical representation of an exemplary communication environment in which the various apparatuses, systems, and methods disclosed herein may be utilized.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within this disclosure.

DETAILED DESCRIPTION OF EXEMPLARY EMBODIMENTS

Preexisting infrastructure of electrical transmission and/or distribution systems, such as utility poles, electrical cables, and the like, is sometimes employed for carrying fiber optic communication cables, thereby reducing or eliminating the need to acquire separate utility easements or build separate cable-carrying infrastructure. This technology, sometimes termed "aerial outside plant (OSP)" technology, often involves attaching the fiber optic cable to the utility poles (e.g., using either a self-supporting cable or lashing the fiber optic cable to a separate messenger cable) in an unused communication space along the poles between the electrical power lines and ground level (e.g., as determined by various regulations). In other examples, the fiber optic cable may be attached to a preexisting fiber optic cable or electrical power cable, such as by way of helically wrapping the fiber optical cable about the preexisting cable.

While use of the electrical transmission or distribution infrastructure reduces some of the overall cost and complexity of planning and installing the fiber optic cable, several significant tasks are still involved, such as performing a pole (or tower) loading analysis on each utility pole to determine whether the poles are adequate for carrying the extra weight imposed by the fiber optic cable and additional equipment, to facilitate repositioning of incumbent communication cables on the poles, the actual upgrading of the poles (where necessary), and so on. In addition, while the process of installing the cables may be aided by powered or unpowered devices (e.g., to lash the optical cable onto a preexisting cable), a crew of several workers is typically required to climb the utility poles to transition such devices from one cable span to the next.

Additionally, when installing fiber optic cable in such an environment, a significant concern is the ability to deploy long, continuous spans of the cable to minimize the total number of splices for each fiber, as each splice typically requires a significant amount of time to install (e.g., using fusion or mechanical splices) and introduces an insertion loss into the corresponding fiber, thus reducing the overall span over which the fiber optic cable may be employed. For example, in some cases, fusion splices at a single location for a 96-fiber cable may consume multiple hours to install and may introduce losses that reduce the operational path length of the associated cable by nearly half a kilometer. While longer continuous spans of fiber optic cable are thus desirable, the additional weight associated with such spans, along with an installation device that may be used to wrap the cable about the powerline conductor, may exceed the load limits of the conductor, thus possibly complicating the installation process.

The present disclosure is generally directed to apparatuses, systems, and methods for fiber optic communication via duct installation. In some embodiments, installing fiber optic cable duct in manageable lengths onto a powerline conductor, coupling together those lengths, and then using the coupled portions of duct as a conduit to install a substantially long section of fiber optic cable spanning the multiple duct segments, may facilitate lower overall insertion losses in the fibers of the fiber optic cable, as well as a less arduous installation procedure. In turn, use of such apparatuses, systems, and methods may provide a number of advantages over conventional approaches, such as more cost-effective planning, installation, and operation of the fiber optic cable.

Features from any of the embodiments discussed below may be used in combination with one another in accordance with the general principles described herein. These and other embodiments, features, and advantages will be more fully understood upon reading the following detailed description in conjunction with the accompanying claims and drawings.

The following will provide, with reference to FIGS. 1-7, detailed descriptions of apparatuses, systems, and methods for fiber optic communication via duct installation. An exemplary communication environment in which the various embodiments disclosed herein may be utilized is discussed in connection with FIG. 1. A discussion of exemplary fiber optic cable ducts including a plurality of microducts, segments of which may be joined using a duct coupler, are presented in conjunction with FIGS. 2-5. An exemplary spool stack that may carry multiple segments of fiber optic cable ducts for installation is described in connection with FIG. 6. Also, an exemplary method of deploying a fiber optic cable along a powerline conductor via duct installation is presented in association with FIG. 7.

FIG. 1 is a graphical representation of an exemplary communication environment 100 in which various apparatuses, systems, and methods disclosed herein may be utilized. As depicted in the example of FIG. 1, communication environment 100 may include an electrical power transmission or distribution system having a plurality of utility poles 102 carrying multiple powerline conductors 110. While any number of powerline conductors 110 may be carried via utility poles 102, two powerline conductors 110 are illustrated in FIG. 1 for visual simplicity. In some examples, powerline conductors 110 are mechanically coupled to utility poles 102 via insulators 104, although other types of components (e.g., taps, standoffs, etc.) may be employed in various embodiments. While specific reference is made herein to utility poles 102, any type of utility pole, H-frame, lattice tower, or other type of pole or tower that carries or supports one or more powerline conductors 110 may be included and covered in various embodiments of communication environment 100 discussed below. Additionally, powerline conductors 110 may include one or more phase conductors, ground wires, static wires, or other conductors supported by utility poles 102, towers, or the like.

Also shown in FIG. 1 is fiber optic cable duct 112 aligned with, and mechanically coupled to, powerline conductor 110. In some embodiments, fiber optic cable duct 112 may be helically wrapped about powerline conductor 110, such as by way of a human-powered or electrically-powered robotic device. However, other physical relationships between powerline conductor 110 and duct 112 are also possible. While only one duct 112 is depicted in FIG. 1, multiple powerline conductors 110 employing the same utility poles 102 may each have a corresponding duct 112 attached or otherwise coupled thereto. As depicted in FIG. 1, duct 112 may be secured to powerline conductor 110 via one or more cable clamps 106. In some examples, duct 112 may follow a powerline conductor 110 associated with a particular phase of the power being transmitted, or may alternate between two or three different phases, such as at phase-to-ground transitions 114 at utility poles 102. As described in greater detail below, each duct 112 may carry one or more fiber optic cables for facilitating communication within communication environment 100.

Additionally, FIG. 1 illustrates an optical fiber splice case 108 that, in some embodiments, splices together corresponding ends of optical fibers of fiber optic cable carried within duct 112. For example, relatively long stretches (e.g., multiple-kilometer spans) of fiber optic cable that may be coupled to powerline conductor 110 may be mechanically coupled together, thermally fused together, or otherwise coupled in optical fiber splice case 108, which may include optical couplers, amplifiers, and/or other components to facilitate transmission of optical data signals from one span of fiber optic cable to the next. In some examples, such as that shown in FIG. 1, optical fiber splice case 108 may be attached to, or positioned on, a utility pole 102. In some examples, such as that depicted in FIG. 1, optical fiber splice case 108 may be mounted on a lower portion of utility pole 102 (e.g., in a lower-voltage section at a safe distance away from higher-voltage powerline conductor 110 to facilitate installation of optical fiber splice case 108). Additionally, in some embodiments, a phase-to-ground transition 114 may be coupled with each fiber optic cable to be interconnected to provide electrical isolation from powerline conductor 110. However, other locations for optical fiber splice case 108 may also be possible.

Figure 2:
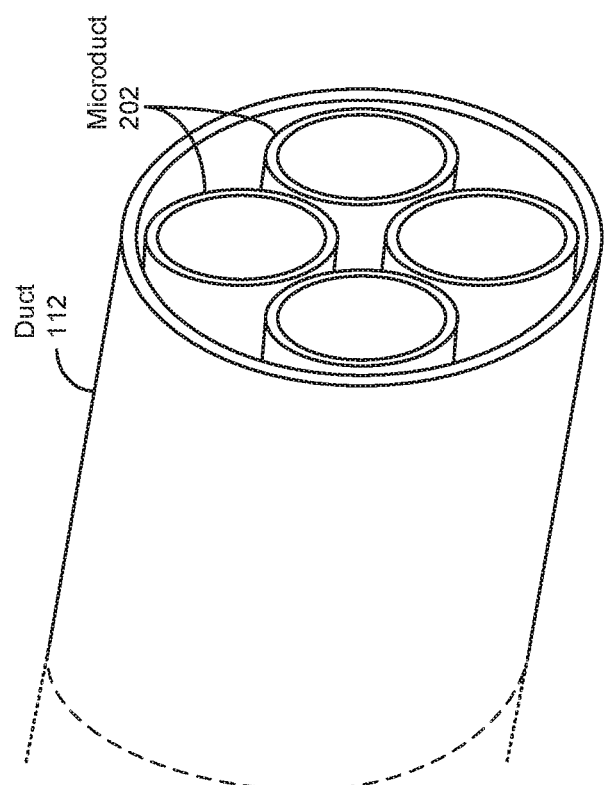
FIG. 2 is a perspective view of an exemplary fiber optic cable duct including a plurality of microducts.

FIG. 2 is a perspective view of an end of an exemplary fiber optic cable duct 112 that includes a plurality of microducts 202, each of which may carry one or more fiber optic cables. In the particular example of FIG. 2, four microducts 202 are included within duct 112, although fewer or greater numbers of microducts 202 may be used in other examples. In other embodiments, duct 112 may not include any microducts 202. One example of duct 112 including microducts 202 may be a four-way 10/8 duct 112, which may include four microducts 202, each of which may exhibit an outer diameter of 10 millimeters (mm) and an inner diameter of 8 mm. However, many other types of duct 112, without or without internal microducts 202, may be used to carry one or more fiber optic cables in other embodiments.

As illustrated in FIG. 2, a cross-sectional view of duct 112 may be substantially circular. In other examples, such as that depicted in FIG. 3, duct 112A may be shaped (e.g., eccentrically) to ensure placement of powerline conductor 110 at a specific position (e.g., a trough 302) along duct 112A to ensure that the fiber optic cables carried within duct 112A (e.g., within microducts 202) maintain a predetermined minimum distance from powerline conductor 110. In such examples, this minimum distance may reduce polarization rotation (e.g., induced by nearby lightning strikes), which may be a source of errors in high-data-rate optical communications facilitated by the fiber optic cables. In some embodiments, the minimum distance may be enforced by way of duct 112A defining a spacer region 304 (e.g., a hollow, partially hollow, or solid region) between trough 32 and microducts 202.

Figure 3:
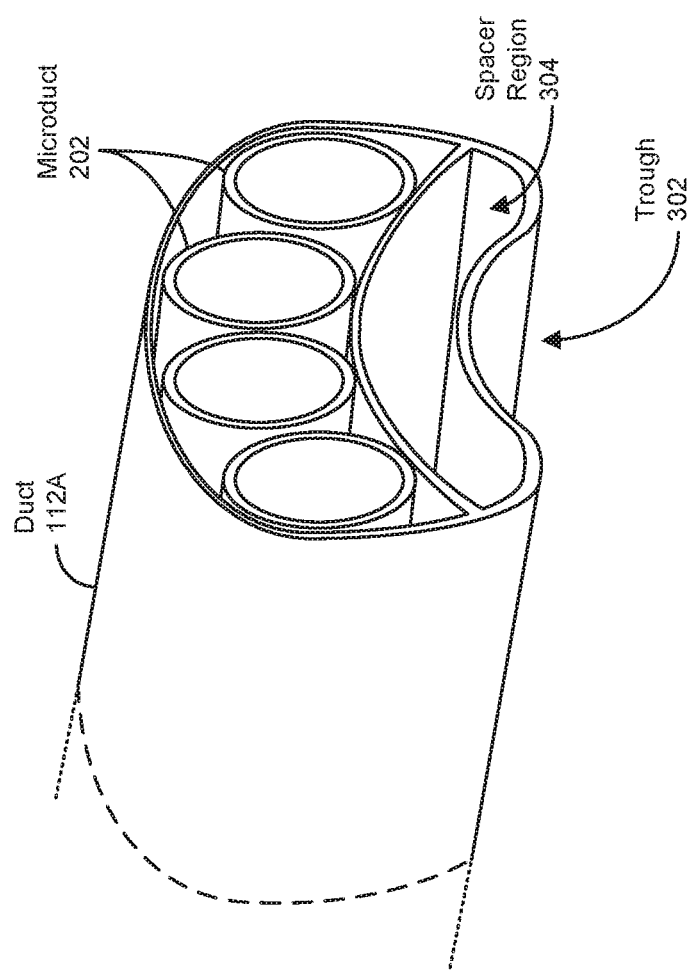
FIG. 3 is a perspective view of another exemplary fiber optic cable duct including a plurality of microducts arranged eccentrically within the fiber optic cable duct.
Figure 4:
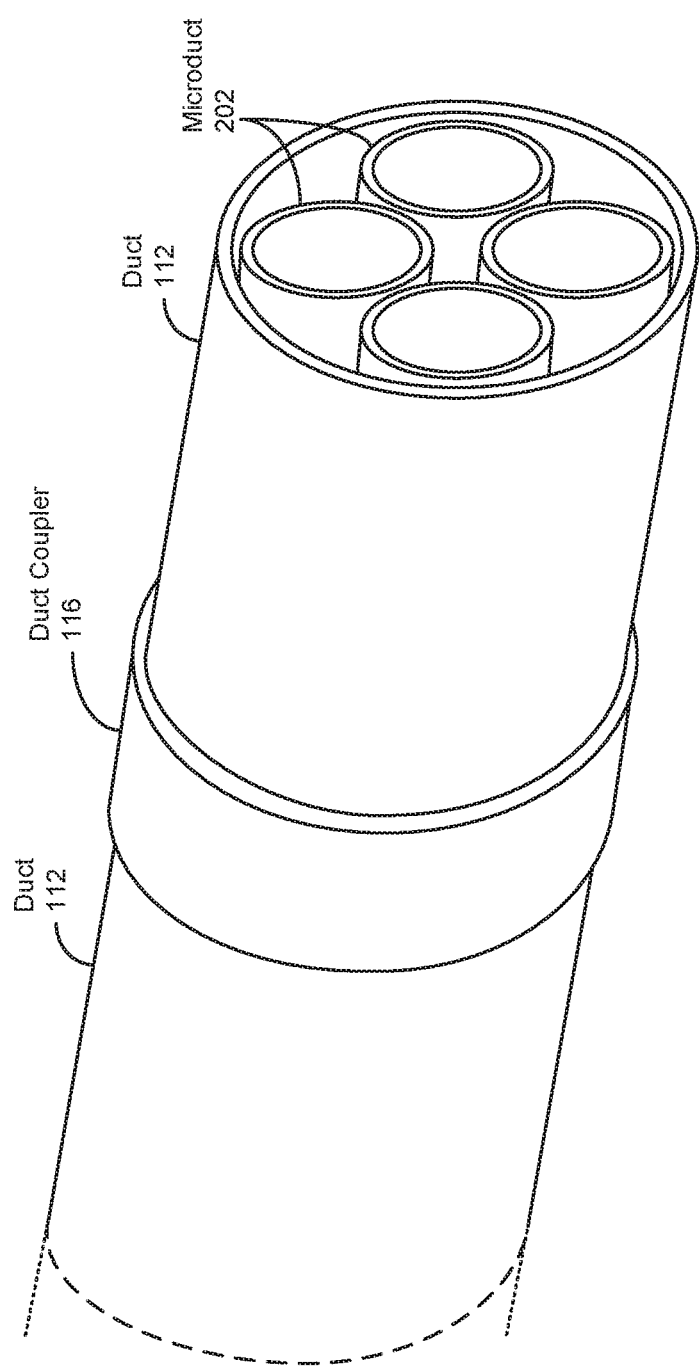
FIG. 4 is a perspective view of two segments of exemplary fiber optic cable duct including a plurality of microducts, where the two segments are joined using a duct coupler.

FIG. 4 is a perspective view of two segments of duct 112 of FIG. 2 joined using duct coupler 116. In some embodiments, duct coupler 116 is joined at the end of a segment of duct 112 by way of aligning an opening or port of duct coupler 116 with an end of duct 112 and pressing duct coupler 116 and duct 112 together. Consequently, the operation of coupling two segments of duct 112 using duct coupler 116 may be much faster than splicing multiple fibers of two sections of fiber optic cable together. In other embodiments in which other fiber optic cable ducts, such as duct 112A of FIG. 3, are employed, a corresponding duct coupler configured to interface with the ends of duct 112A may be utilized to join two such ducts 112A together.

Figure 5:
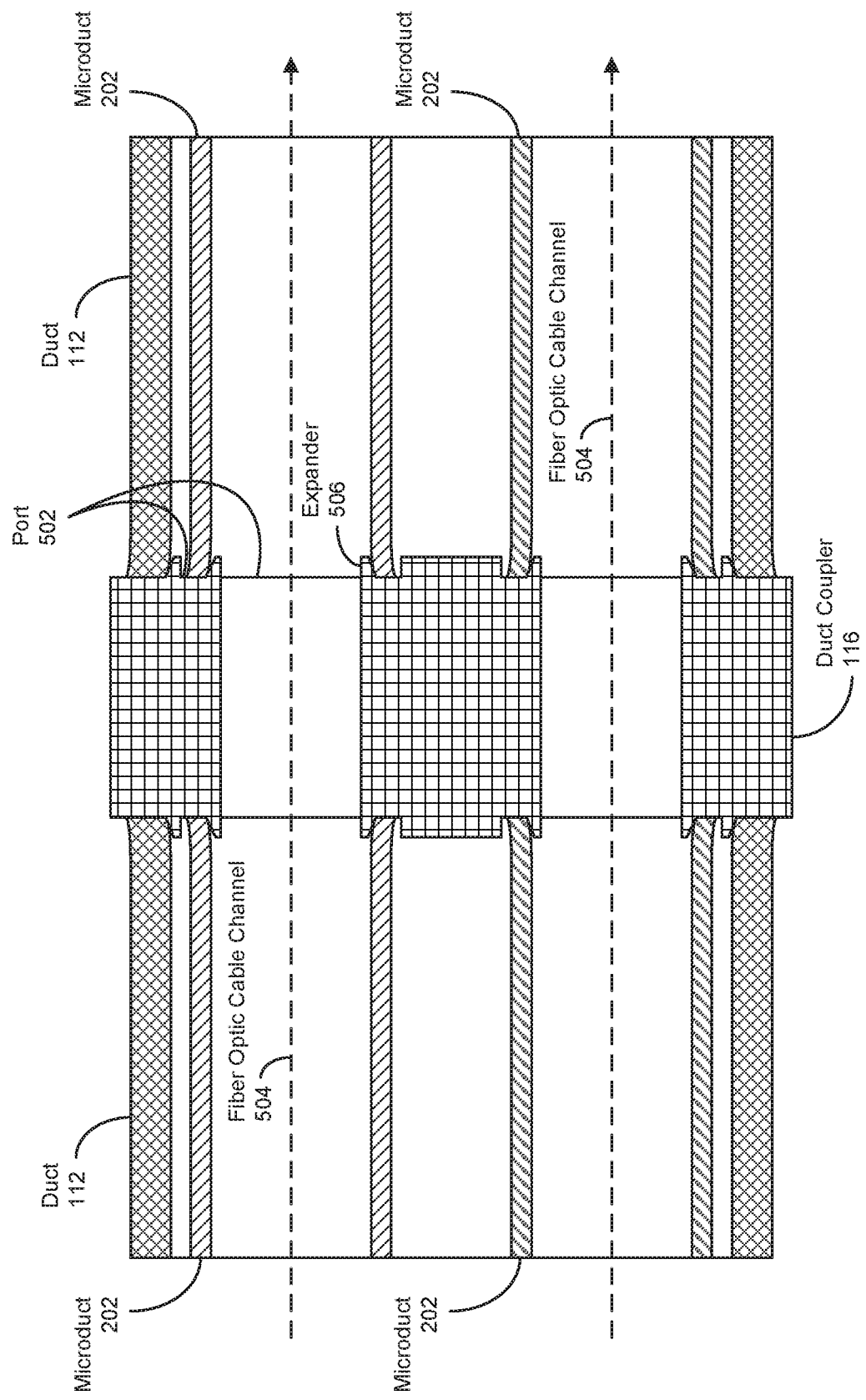
FIG. 5 is a side cross-sectional view of the two fiber optic cable ducts and the duct coupler of FIG. 4.

FIG. 5 is a side cross-sectional view of two segments of fiber optic cable duct 112 joined using duct coupler 116, as depicted in FIG. 4. In some embodiments, duct coupler 116 may include a port 502 or opening (e.g., a circular opening) to be coupled with an end of each microduct 202 of a segment of duct 112 and may possibly include a separate port 502 for each end of the larger duct 112 containing microducts 202. Further, in some examples, each port 502 of duct coupler 116 may include an expander 506 that may spread or enlarge the end of the microduct 202 or duct 112 being coupled thereto when duct coupler 116 is pressed into the end of duct 112. In some examples, each port 502 may include one or more features (e.g., ridges, press-fit locks, or the like) that aid the duct coupler 116 in retaining the associated end of duct 112 or microduct 202. Further, in some embodiments, ports 502 of duct coupler 116 may be arranged or configured to match the arrangement of the ends of microducts 202 and duct 112, as shown in FIGS. 2, 4, and 5. In some embodiments, a tool may be employed to prepare the ends of microducts 202 and/or duct 112 (e.g., peeling a portion of duct 112 away from the ends of included microducts 202, separating individual microducts 202 away from each other, or the like) prior to pressing the ends of microducts 202 onto duct coupler 116. In some examples, the preparation of one or both ends of a segment of duct 112 and/or microducts 202 may be performed prior to loading onto a spool employed to wrap duct 112 about powerline conductor 110, or automatically by way of a robotic device during installation of duct 112. An example of an exemplary spool or bobbin arrangement employable for such a purpose is discussed below in connection with FIG. 6.

In some examples, once installed, duct coupler 116 couples the two segments of duct 112 such that a continuous, substantially hermetic fiber optic cable channel 504 is formed using one microduct 202 of one segment of duct 112 and a corresponding microduct 202 of the other segment of duct 112 being joined therewith. While the cross-sectional view of FIG. 5 only illustrates two microducts 202 of each duct 112, each of the four microducts 202 of each duct 112, as depicted in FIG. 2, may be coupled in a similar manner, possibly resulting in four separate channels 504. Further, additional segments of duct 112 may be joined using additional duct couplers 116, resulting in resulting in longer overall channels 504, into each of which a contiguous fiber optic cable may be installed or inserted. Insertion of the fiber optic cable into channel 504 may including mechanically pulling or pushing the fiber optic cable into channel 504, or pneumatically blowing or "jetting" the fiber optic cable into channel 504.

Figure 6:
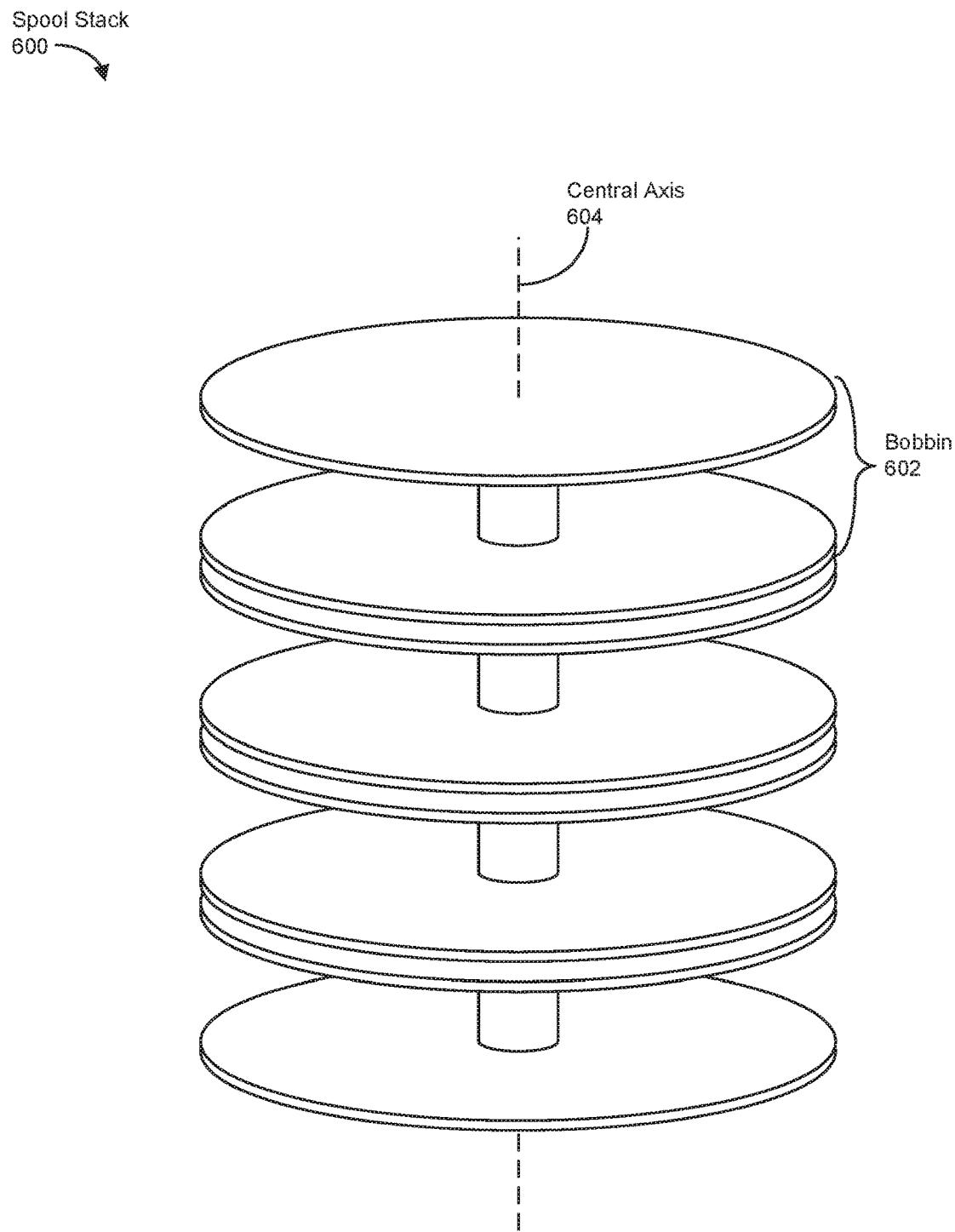
FIG. 6 is a perspective view of an exemplary spool stack that may carry multiple segments of fiber optic cable ducts for installation.

In some embodiments, installation of the segments of duct 112 and associated duct couplers 116 (e.g., onto powerline conductor 110) may involve the use of an installation device or system, such as a robotic device with one or more spools for carrying duct 112 prior to installation of duct 112 onto powerline conductor 110. In some examples, duct 112 may endure a relatively small bend radius without damaging duct 112, possibly unlike the fiber optic cables to be installed. Accordingly, a significant length of duct 112 may be carried on a single spool (e.g., a bobbin-shaped spool). FIG. 6 is a perspective view of an exemplary spool stack 600 including multiple bobbins 602 that may be stacked (e.g., coaligned along their respective central axes 604 about which duct 112 is wound), according to some embodiments. Further, in some examples, bobbins 602 may be configured such that one end of a segment of duct 112 on one bobbin 602 may be each coupled an end of a segment of duct 112 on an adjacent bobbin 602 of spool stack 600. Consequently, each bobbin 602 may be carried up a utility pole 102 by a separate person (e.g., a linesperson), with spool stack 600 thereafter being assembled near the top of utility pole 102. In some examples, each bobbin 602 may be loaded onto the robotic device, one at a time, and the segment of duct 112 of one bobbin 602 may be coupled to the segment of duct 112 of an adjacent bobbin 602 (e.g., using duct coupler 116), substantially resulting in a single continuous length of duct 112 (e.g., including continuous lengths of microducts 202) being assembled prior to being deployed by the robotic device onto powerline conductor 110.

In some examples, the robotic device, once loaded with a spool (e.g., spool stack 600) carrying one or more segments of duct 112, may wrap duct 112 about powerline conductor 110 as the robotic device travels along powerline conductor 110 between utility poles 102. In some embodiments, the robotic device may traverse over typical utility pole obstacles, such as electrical insulators and taps, thus potentially enabling installation of long (e.g., 1 km or more) lengths of duct 112 without direct human intervention at each utility pole 102. In some examples, the robotic device may operate in a remote-controlled and/or autonomous manner (e.g., using electronics located onboard the robotic device).

In some embodiments, the robotic device may include a power cable crawling subsystem that propels the robotic device along powerline conductor 110, and a fiber wrapping subsystem that wraps the fiber optic cable about powerline conductor 110 while "paying out" duct 112 as the robotic device proceeds along powerline conductor 110. In some examples, the crawling subsystem may remain aligned upright during travel, and may be configured to avoid insulators and other obstacles, such as those extending below powerline conductor 110. The crawling subsystem, in some embodiments, may include a safety catch mechanism that prevents the robotic device from detaching from powerline conductor 110.

In some examples, the robotic device may include two or more subcomponents, each of which may be configured to consume a small enough volume and weight to be carried by a single linesperson toward the top of utility pole 102, where the subcomponents may be coupled together to form the robotic device. Further, in some examples, each subcomponent may include clips or other features that may retain straps to facilitate carrying (e.g., like a backpack) by a linesperson.

In some embodiments, the robotic device may automatically dispense and install clamps (e.g., clamps 106), ties, or similar devices to affix duct 112 to powerline conductor 110 as the robotic device wraps duct 112 about powerline conductor 110. In some examples, clamp 106 may be spring-loaded to facilitate opening of clamp 106 (e.g., by way of robotic device triggering a latch), after which the robotic device may install clamp 106 about duct 112 and powerline conductor 110 before closing clamp 106. In some examples, clamp 106 may include a magnetic or ferromagnetic portion that may interact with a corresponding magnetic, electromagnetic, or ferromagnetic subcomponent of the robotic device to retain clamp 106 when releasing the latch to open clamp 106 prior to installation.

Also, the robotic device, in some examples, may detect an end of a first segment of duct 112 (e.g., when being wrapped about powerline conductor 110, or after such wrapping) and install duct coupler 116 thereon, couple an end of a second segment of duct 112 onto duct coupler 116, and continue wrapping the second segment of duct 112 onto powerline conductor 110.

Figure 7:
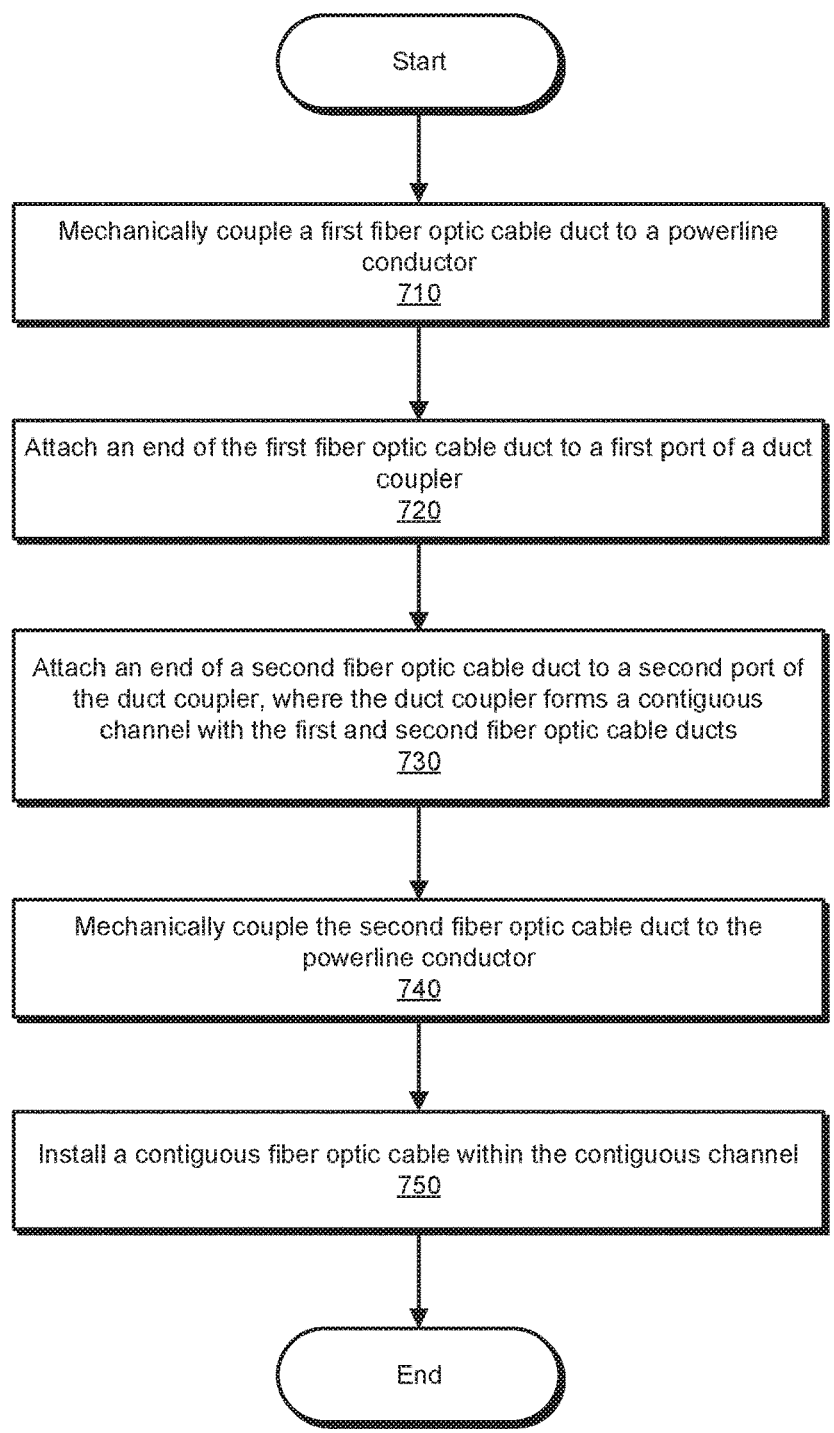
FIG. 7 is a flow diagram of an exemplary method of deploying a fiber optic cable along a powerline conductor via duct installation.

FIG. 7 is a flow diagram of an exemplary method 700 of employing a fiber optic cable along a powerline conductor via duct installation. In the method 700, at step 710, a first fiber optic cable duct (e.g., duct 112) may be mechanically coupled to a powerline conductor (e.g., powerline conductor 110). In some examples, a robotic device, such as that described above, may perform the coupling, such as by helically wrapping the duct about the powerline conductor as the robotic device travels along the conductor, periodically attaching a clamp (e.g., clamp 106) to secure the duct to the powerline conductor, and/or other operations.

In some embodiments, prior to the coupling of the duct to the powerline conductor, segments of the duct (e.g., 100-meter (m) segments) may be loaded onto one or more spools (e.g., bobbins 602 of spool stack 600). Also, the robotic device, along with the loaded spools, may be elevated to the powerline conductor as a number of subcomponents by several linespersons (e.g., by climbing utility pole 102, a lattice tower, or other structure supporting the powerline conductor).

At step 720, an end of the first duct may be attached to a first port of a duct coupler (e.g., port 502 of duct coupler 116). Additionally, at step 730, an end of a second duct may be attached to a second port of the duct coupler, where the duct coupler forms a contiguous channel with the first and second ducts. In some examples, the first and second ports may include a plurality of ports for a plurality of microducts (e.g., microducts 202) included in the duct, as discussed above. Consequently, in such cases, the duct coupler may form a plurality of separate contiguous channels, where each channel includes a microduct of the first duct and corresponding microduct of the second duct. In some examples, the robotic device may perform this coupling autonomously or semi-autonomously after nearly all of the first duct has been mechanically coupled to the powerline conductor, as discussed earlier. In other embodiments, a linesperson may perform this coupling (e.g., coupling a first duct of a first bobbin with a second duct of a second bobbin) prior to the robotic device coupling the first duct to the powerline conductor. For example, the linesperson may attach a duct loaded on one bobbin of a spool stack via a duct coupler of a second bobbin after the second bobbin is loaded onto the spool stack.

At step 740, the robotic device may mechanically couple the second duct to the powerline conductor, such as in a fashion similar to that discussed above in connection with step 710. In some embodiments, at multiple access points (e.g., as the robotic device encounters each utility pole or lattice tower), one or more linespersons may swap the current (e.g., unloaded) spools with loaded spools on the robotic device, and continue the duct installation process. In cases in which enough duct was loaded onto the robotic device to cover the previous length of powerline conductor (e.g., from the previous utility pole to the current utility pole), the linesperson may send the robotic device on the powerline conductor toward the next utility pole. In examples in which the length of loaded duct was insufficient to cover the length of powerline conductor leading to the current utility pole, the linesperson may send the robotic device on the powerline conductor in the reverse direction toward the previous utility pole, detect the free end of the last duct coupled to the conductor, couple the free end to an end of a duct that was newly loaded on the robotic device, and then begin coupling that duct onto the powerline conductor back toward the current utility pole, and possibly toward the next utility pole in sequence.

As a result of these operations, multiple segments of duct may be coupled together and extend along several utility poles of the powerline conductor, resulting in one or more contiguous channels (e.g., substantially hermetic channels) extending along the entirety of the multiple segments of duct. Thereafter, at step 750, at least one fiber optic cable (e.g., one fiber optic cable per microduct 202) may be installed within a corresponding contiguous channel, such as jetting the cable into the channel. In other examples, the cable may be pulled within the channel or pushed into the channel.

As explained above in conjunction with FIGS. 1 through 7, the apparatuses, systems, and methods described herein may facilitate the coupling of substantially long spans of fiber optic cable along a powerline conductor by way of first installing fiber optic cable duct, thus possibly reducing the number optical splices required over prior installation techniques, potentially resulting in lower installation times and costs, as well as improved optical communication quality.

EXAMPLE EMBODIMENTS

Example 1: A method may include (1) mechanically coupling a first fiber optic cable duct to a powerline conductor, (2) attaching an end of the first fiber optic cable duct to a first port of a duct coupler, (3) attaching an end of a second fiber optic cable duct to a second port of the duct coupler, where the duct coupler forms a contiguous channel with the first fiber optic cable duct and the second fiber optic cable duct, (4) mechanically coupling the second fiber optic cable duct to the powerline conductor, and (5) installing a contiguous fiber optic cable within the contiguous channel.

Example 2: The method of Example 1, where attaching the end of the first fiber optic cable duct to the first port of the duct coupler may include pressing the first port of the duct coupler into the end of the first fiber optic cable duct.

Example 3: The method of Example 1, where the contiguous channel may be hermetic along the first fiber optic cable duct, the duct coupler, and the second fiber optic cable duct.

Example 4: The method of any of Examples 1, 2, or 3, where (1) the first fiber optic cable duct may include a first plurality of microducts located within the first fiber optic cable duct, (2) the second fiber optic cable duct may include a second plurality of microducts located within the second fiber optic cable duct, and (3) the duct coupler, when attached to the end of the first fiber optic cable duct and the second fiber optic cable duct, may form a separate contiguous channel with each microduct of the first fiber optic cable duct and corresponding microduct of the second fiber optic cable duct.

Example 5: The method of Example 4, where each separate contiguous channel may include a separate hermetic fiber optic cable channel.

Example 6: The method of any of Examples 1, 2, or 3, where installing the contiguous fiber optic cable within the contiguous channel may include jetting the contiguous fiber optic cable into the contiguous channel.

Example 7: The method of any of Examples 1, 2, or 3, where mechanically coupling the first fiber optic cable duct to the powerline conductor may include helically wrapping the first fiber optic cable duct about the powerline conductor.

Example 8: The method of any of Examples 1, 2, or 3, where the method may further include unrolling the first fiber optic cable duct from a spool carrying the first fiber optic cable duct as the first fiber optic cable duct is mechanically coupled to the powerline conductor.

Example 9: The method of Examples 1, 2, or 3, where mechanically coupling the first fiber optic cable duct to the powerline conductor may be performed by a robotic device as the robotic device travels along the powerline conductor.

Example 10: A duct coupler may include (1) a first port configured to attach to an end of a first fiber optic cable duct, and (2) a second port configured to attach to an end of a second fiber optic cable duct, and (3) where, when the first port is attached to the end of the first fiber optic cable duct and the second port is attached to the end of the second fiber optic cable duct, the duct coupler may form a contiguous channel with the first fiber optic cable duct and the second fiber optic cable duct to carry a fiber optic cable.

Example 11: The duct coupler of Example 10, where the contiguous channel may be hermetic along the first fiber optic cable duct, the duct coupler, and the second fiber optic cable duct.

Example 12: The duct coupler of Example 10, where the first port and the second port may be located on opposing sides of the duct coupler.

Example 13: The duct coupler of Example 10, where the first port and the second port may include at least one retaining feature that retains the end of the first fiber optic cable duct and the end of the second fiber optic cable duct.

Example 14: The duct coupler of Example 10, where (1) the first port may include a first expander that expands the end of the first fiber optic cable duct as the end of the first fiber optic cable duct is pressed onto the first port, and (2) the second port may include the second port may include a second expander that expands the end of the second fiber optic cable duct as the end of the second fiber optic cable duct is pressed onto the second port.

Example 15: The duct coupler of any of Examples 10-14, where (1) the first port may be further configured to attach to an end of each of a first plurality of microducts of the first fiber optic cable duct, and (2) the second port may be further configured to attach to an end of each of a second plurality of microducts of the second fiber optic cable duct, and (3) where, when the first port is attached to the end of each of the first plurality of microducts and the second port is attached to the end of each of the second plurality of microducts, the duct coupler may form a separate contiguous channel with each microduct of the first fiber optic cable duct and corresponding microduct of the second fiber optic cable duct.

Example 16: The duct coupler of Example 15, where (1) the first port may include a first expander for each of the first plurality of microducts of the first fiber optic cable duct, where each first expander expands the end of a corresponding one of the first plurality of microducts when the end of the first fiber optic cable duct is pressed onto the first port, and (2) the second port may include a second expander for each of the second plurality of microducts of the second fiber optic cable duct, where each second expander expands the end of a corresponding one of the second plurality of microducts when the end of the second fiber optic cable duct is pressed onto the second port.

Example 17: The duct coupler of Example 15, where (1) the first port may be configured such that the ends of the first plurality of microducts are arranged eccentrically at the first port when attached to the first port, and (2) the second port may be configured such that the ends of the second plurality of microducts are arranged eccentrically at the second port when attached to the second port.

Example 18: A fiber optic cable duct may include (1) an outer duct that defines an interior volume, where the outer duct is shaped eccentrically, and (2) a plurality of microducts arranged within the interior volume, where each of the plurality of microducts defines a fiber optic cable channel that is configured to carry a corresponding fiber optic cable.

Example 19: The fiber optic cable duct of Example 18, where the outer duct may be shaped eccentrically such that the outer duct provides a physical feature with which a powerline conductor aligns when the fiber optic cable duct is mechanically coupled to the powerline conductor.

Example 20: The fiber optic cable duct of either Example 18 or Example 19, where the plurality of microducts may be arranged eccentrically within the outer duct such that, when the fiber optic cable duct is mechanically coupled to the powerline conductor, each of the fiber optic cables carried within the plurality of microducts maintains at least a predetermined distance from the powerline conductor.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   mechanically coupling a first fiber optic cable duct to a powerline conductor, wherein the first fiber optic cable duct comprises a first plurality of microducts located within the first fiber optic cable duct;
   attaching an end of the first fiber optic cable duct to a first port of a duct coupler;
   attaching an end of a second fiber optic cable duct to a second port of the duct coupler, wherein the second fiber optic cable duct comprises a second plurality of microducts located within the second fiber optic cable duct, and wherein the duct coupler forms a contiguous channel with the first fiber optic cable duct and the second fiber optic cable duct and forms a separate contiguous channel with each microduct of the first fiber optic cable duct and corresponding microduct of the second fiber optic cable duct;
   mechanically coupling the second fiber optic cable duct to the powerline conductor; and
   installing a contiguous fiber optic cable within the contiguous channel.

2. The method of claim 1, wherein attaching the end of the first fiber optic cable duct to the first port of the duct coupler comprises pressing the first port of the duct coupler into the end of the first fiber optic cable duct.

3. The method of claim 1, wherein the contiguous channel is hermetic along the first fiber optic cable duct, the duct coupler, and the second fiber optic cable duct.

4. The method of claim 1, wherein each separate contiguous channel comprises a separate hermetic fiber optic cable channel.

5. The method of claim 1, wherein installing the contiguous fiber optic cable within the contiguous channel comprises jetting the contiguous fiber optic cable into the contiguous channel.

6. The method of claim 1, wherein mechanically coupling the first fiber optic cable duct to the powerline conductor comprises helically wrapping the first fiber optic cable duct about the powerline conductor.

7. The method of claim 1, further comprising:
unrolling the first fiber optic cable duct from a spool carrying the first fiber optic cable duct as the first fiber optic cable duct is mechanically coupled to the powerline conductor.

8. The method of claim 1, wherein mechanically coupling the first fiber optic cable duct to the powerline conductor is performed by a robotic device as the robotic device travels along the powerline conductor.

\* \* \* \* \*